United States Patent
Redi et al.

(10) Patent No.: US 8,026,849 B2
(45) Date of Patent: *Sep. 27, 2011

(54) SYSTEMS AND METHODS FOR THREE DIMENSIONAL ANTENNA SELECTION AND POWER CONTROL IN AN AD-HOC WIRELESS NETWORK

(75) Inventors: Jason Keith Redi, Belmont, MA (US); Eric Gustav Brett, Westford, MA (US); William Dugald Watson, Jr., Pepperell, MA (US)

(73) Assignee: Raytheon BBN Technologies Corp., Cambridge, MA (US)

( * ) Notice: Subject to any disclaimer, the term of this patent is extended or adjusted under 35 U.S.C. 154(b) by 1160 days.

This patent is subject to a terminal disclaimer.

(21) Appl. No.: 11/656,767

(22) Filed: Jan. 23, 2007

(65) Prior Publication Data

US 2007/0149204 A1    Jun. 28, 2007

Related U.S. Application Data

(62) Division of application No. 10/355,556, filed on Jan. 31, 2003, now Pat. No. 7,286,844.

(51) Int. Cl.
  *H04B 7/00* (2006.01)
(52) U.S. Cl. .............. 342/367; 455/412; 455/456.1
(58) Field of Classification Search ............. 455/63.4, 455/13.4, 69, 63.1, 67.11, 226.1, 456.1, 465.5, 455/456.6; 342/74, 81, 357.09, 357.17, 359, 342/386, 367
See application file for complete search history.

(56) References Cited

U.S. PATENT DOCUMENTS

| | | | |
|---|---|---|---|
| 4,964,121 A | 10/1990 | Moore | |
| 5,128,938 A | 7/1992 | Borras | |
| 5,203,020 A | 4/1993 | Sato et al. | |
| 5,301,225 A | 4/1994 | Suzuki et al. | |
| 5,430,731 A | 7/1995 | Umemoto et al. | |
| 5,590,396 A | 12/1996 | Henry | |
| 5,649,108 A | 7/1997 | Spiegel et al. | |
| 5,710,975 A | 1/1998 | Bernhardt et al. | |
| 5,754,790 A | 5/1998 | France et al. | |
| 6,028,853 A | 2/2000 | Haartsen | |
| 6,058,106 A | 5/2000 | Cudak et al. | |
| 6,118,769 A | 9/2000 | Pries et al. | |
| 6,127,799 A | 10/2000 | Krishnan | |
| 6,130,881 A | 10/2000 | Stiller et al. | |
| 6,188,911 B1 | 2/2001 | Wallentin et al. | |
| 6,243,579 B1 | 6/2001 | Kari et al. | |
| 6,304,215 B1 | 10/2001 | Proctor et al. | |
| 6,359,901 B1 | 3/2002 | Todd et al. | |
| 6,374,311 B1 | 4/2002 | Mahany et al. | |

(Continued)

OTHER PUBLICATIONS

Ebner et al, "Synchronization in Ad Hoc Networks Based on UTRA TDD" (2003).

(Continued)

*Primary Examiner* — Temica M Beamer
(74) *Attorney, Agent, or Firm* — Ropes & Gray LLP

(57) ABSTRACT

A system (105) determines a power level for transmitting to a neighboring node in a wireless network. The system (105) receives a message indicating a three-dimensional position and orientation of the neighboring node and a type of directional antenna of the neighboring node that transmitted the message. The system (105) determines the power level for transmitting to the neighboring node based on the three-dimensional position and orientation of the neighboring node and the type of the directional antenna.

19 Claims, 14 Drawing Sheets

U.S. PATENT DOCUMENTS

| | | | |
|---|---|---|---|
| 6,377,211 B1 * | 4/2002 | Hsiung | 342/359 |
| 6,400,317 B2 | 6/2002 | Rouphael et al. | |
| 6,404,386 B1 | 6/2002 | Proctor et al. | |
| 6,418,148 B1 | 7/2002 | Kumar et al. | |
| 6,463,307 B1 | 10/2002 | Larsson et al. | |
| 6,476,773 B2 | 11/2002 | Palmer et al. | |
| 6,477,361 B1 | 11/2002 | LaGrotta et al. | |
| 6,490,461 B1 | 12/2002 | Muller | |
| 6,498,939 B1 | 12/2002 | Thomas | |
| 6,512,935 B1 | 1/2003 | Redi | |
| 6,564,074 B2 | 5/2003 | Romans | |
| 6,583,675 B2 | 6/2003 | Gomez | |
| 6,598,034 B1 | 7/2003 | Kloth | |
| 6,611,231 B2 | 8/2003 | Crilly et al. | |
| 6,611,233 B2 * | 8/2003 | Kimura | 342/458 |
| 6,714,983 B1 | 3/2004 | Koenck et al. | |
| 6,721,275 B1 | 4/2004 | Rodeheffer et al. | |
| 6,735,178 B1 | 5/2004 | Srivastava et al. | |
| 6,735,630 B1 | 5/2004 | Gelvin et al. | |
| 6,745,027 B2 | 6/2004 | Twitchell, Jr. | |
| 6,757,248 B1 | 6/2004 | Li et al. | |
| 6,791,949 B1 | 9/2004 | Ryu et al. | |
| 6,804,208 B2 | 10/2004 | Cain et al. | |
| 6,816,115 B1 | 11/2004 | Redi et al. | |
| 6,859,135 B1 | 2/2005 | Elliott | |
| 6,894,975 B1 | 5/2005 | Partyka | |
| 6,981,052 B1 | 12/2005 | Cheriton | |
| 6,990,075 B2 | 1/2006 | Krishnamurthy et al. | |
| 7,020,501 B1 | 3/2006 | Elliott et al. | |
| 7,020,701 B1 | 3/2006 | Gelvin et al. | |
| 7,027,392 B2 | 4/2006 | Holtzman et al. | |
| 7,058,031 B2 | 6/2006 | Bender et al. | |
| 7,088,678 B1 | 8/2006 | Freed et al. | |
| 7,103,344 B2 | 9/2006 | Menard | |
| 7,110,783 B2 | 9/2006 | Bahl et al. | |
| 7,142,520 B1 | 11/2006 | Haverinen et al. | |
| 7,142,864 B2 | 11/2006 | Laroia et al. | |
| 7,155,263 B1 | 12/2006 | Bergamo | |
| 7,165,102 B2 | 1/2007 | Shah et al. | |
| 7,184,413 B2 | 2/2007 | Beyer et al. | |
| 7,218,630 B1 | 5/2007 | Rahman | |
| 7,286,844 B1 * | 10/2007 | Redi et al. | 455/522 |
| 7,342,876 B2 | 3/2008 | Bellur et al. | |
| 7,346,679 B2 | 3/2008 | Padmanabhan et al. | |
| 7,349,370 B2 | 3/2008 | Lee et al. | |
| 7,363,371 B2 | 4/2008 | Kirkby et al. | |
| 7,376,827 B1 | 5/2008 | Jiao | |
| 7,388,847 B2 | 6/2008 | Dubuc et al. | |
| 7,466,655 B1 | 12/2008 | Zhao | |
| 7,489,635 B2 | 2/2009 | Evans et al. | |
| 7,523,220 B2 | 4/2009 | Tan et al. | |
| 7,583,654 B2 | 9/2009 | Zumsteg | |
| 7,599,443 B2 | 10/2009 | Ionescu et al. | |
| 7,664,055 B2 | 2/2010 | Nelson | |
| 7,668,127 B2 | 2/2010 | Krishnamurthy et al. | |
| 7,688,772 B2 | 3/2010 | Sinivaara et al. | |
| 7,719,989 B2 | 5/2010 | Yau | |
| 7,742,399 B2 | 6/2010 | Pun | |
| 7,764,617 B2 | 7/2010 | Cain et al. | |
| 7,881,202 B2 | 2/2011 | Lansing et al. | |
| 2002/0067736 A1 | 6/2002 | Garcia-Luna-Aceves et al. | |
| 2002/0071395 A1 | 6/2002 | Redi et al. | |
| 2002/0145978 A1 | 10/2002 | Batsell et al. | |
| 2002/0146985 A1 | 10/2002 | Naden | |
| 2002/0147816 A1 | 10/2002 | Hlasny | |
| 2002/0186167 A1 | 12/2002 | Anderson | |
| 2003/0037167 A1 | 2/2003 | Garcia-Luna-Aceves et al. | |
| 2003/0099210 A1 | 5/2003 | O'Toole et al. | |
| 2003/0114204 A1 | 6/2003 | Allen et al. | |
| 2003/0179742 A1 | 9/2003 | Ogier et al. | |
| 2003/0185170 A1 | 10/2003 | Allen et al. | |
| 2003/0202490 A1 | 10/2003 | Gunnarsson et al. | |
| 2004/0077353 A1 | 4/2004 | Mahany | |
| 2004/0125773 A1 | 7/2004 | Wilson et al. | |
| 2004/0176023 A1 | 9/2004 | Linder et al. | |
| 2004/0218580 A1 | 11/2004 | Bahl et al. | |
| 2004/0230638 A1 | 11/2004 | Balachandran et al. | |
| 2005/0009578 A1 | 1/2005 | Liu | |
| 2005/0059347 A1 | 3/2005 | Haartsen | |
| 2005/0124313 A1 | 6/2005 | Simpson et al. | |
| 2005/0134403 A1 | 6/2005 | Kajiya | |
| 2005/0135379 A1 | 6/2005 | Callaway et al. | |
| 2005/0176468 A1 | 8/2005 | Iacono et al. | |
| 2005/0185632 A1 | 8/2005 | Draves, Jr. et al. | |
| 2005/0215196 A1 | 9/2005 | Krishnan et al. | |
| 2005/0215280 A1 | 9/2005 | Twitchell, Jr. | |
| 2006/0010249 A1 | 1/2006 | Sabesan et al. | |
| 2006/0013160 A1 | 1/2006 | Haartsen | |
| 2006/0047807 A1 | 3/2006 | Magnaghi et al. | |
| 2006/0068837 A1 | 3/2006 | Malone | |
| 2006/0107081 A1 | 5/2006 | Krantz et al. | |
| 2006/0126514 A1 | 6/2006 | Lee et al. | |
| 2006/0135145 A1 | 6/2006 | Redi | |
| 2006/0215583 A1 | 9/2006 | Castagnoli | |
| 2006/0227724 A1 | 10/2006 | Thubert et al. | |
| 2006/0229083 A1 | 10/2006 | Redi | |
| 2007/0070983 A1 | 3/2007 | Redi et al. | |
| 2007/0110000 A1 | 5/2007 | Abedi | |
| 2007/0153731 A1 | 7/2007 | Fine | |
| 2008/0232258 A1 | 9/2008 | Larsson et al. | |
| 2009/0103461 A1 | 4/2009 | Tan et al. | |
| 2009/0129316 A1 | 5/2009 | Ramanathan et al. | |
| 2009/0161641 A1 | 6/2009 | Kim | |

OTHER PUBLICATIONS

Tjoa R et al: "Clock drift reduction for relative time slot TDMA-based sensor networks" (Sep. 5, 2004) PIMRC 2004, IEEE, pp. 1042-1047.

Dai H et al: "Tsync: A Lightweight Bidirectional Time Synchronization Service for Wireless Sensor Networks" (Jan. 2004), Mobile Computing and Communications Review, ACM, NY, pp. 125-139, ISSN: 1091-1669.

Ebner A et al: "Decentralized slot synchronization in highly dynamic ad hoc networks" Wireless Personal Mutlimedia Communications, 2002, IEEE, vol. 2, (Oct. 27, 2004).

Zhijun Shang et al: "A low overhead multi-hop time sync protocol for wireless sensor networks" Networking, Sensing and Control, 2005, IEEE (Mar. 19, 2005), pp. 54-59.

Singh S et al "Power-Aware Routing in Mobile Ad Hoc Networks" Mobicom '98, Proceedings of the 4th Annual ACM/IEEE International Conference on Mobile Computing and Networking, Dallas, TX (Oct. 25-30, 1998) XP000850267, pp. 181-190.

Fan Ye et al "A randomized energy-conservation protocol for resilient sensor networks" Wireless Networks; The Journal of Mobile Communication, Computation and Information, Kluwer Academic Publishers, Do, vol. 12, No. 5, (Apr. 27, 2006) pp. 637-652.

Office Action dated Apr. 3, 2008, U.S. Appl. No. 10/786,288.

Office Action dated Aug. 26, 2009, U.S. Appl. No. 11/439,320.

Office Action dated Sep. 16, 2009, U.S. Appl. No. 11/347,963.

Hong et al., "Scalable Routing Protocols for Mobile Ad Hoc Networks," IEEE Network; Jul./Aug. 2002; pp. 11-21.

Lang, "A Comprehensive Overview about Selected Ad Hoc Networking Routing Protocols," Mar. 14, 2003.

Halvardsson et al, "Reliable Group Communication in a Military Mobile Ad Hoc Network," Vaxjo University School of Mathematics and Systems Engineering, Report # 04006, Feb. 2004, pp. 1-52.

Wieselthier et al, "On the Construction of Energy-Efficient Broadcast and Multicast Tress in Wireless Networks," IEE Infocom 2000, 2000, p. 585-594.

Ruppe et al, "Near Term Digital Radio (NTDR) System," IE, 1997, pp. 1282-1287.

Clausen, et al, "Optimized Link State Routing Protocol (OLSR)," Technical Memo, RFC 3626, The Internet Society (2003), Oct. 2003, pp. 1-6.

U.S. Appl. No. 10/677,945, Jason Redi.

U.S. Appl. No. 11/895,608, Niky Riga.

U.S. Appl. No. 11/895,527, Basu et al.

U.S. Appl. No. 10/786,288, Brig Barnum Elliott.

Ogier et al, "Topology Dissemination Based on Reverse-Path Forwarding (TBRPF)," Sunsite.dk, Technical Memo, RFC 3684, The Internet Society (2004), Feb. 2004, pp. 149.

Office Action dated Jun. 15, 2007, U.S. Appl. No. 10/677,945.

Office Action dated May 7, 2007, U.S. Appl. No. 11/078,257.
Office Action dated Sep. 8, 2006, U.S. Appl. No. 10/786,288.
Office Action dated Mar. 30, 2007, U.S. Appl. No. 10/786,288.
Office Action dated Sep. 25, 2007, U.S. Appl. No. 10/786,288.
U.S. patent application entitled "Systems and Methods for Antenna Selection in an AD-HOC Wireless Network"; filed on Jan. 31, 2003; Jason Keith Redi et al.; 43 pages.
U.S. patent application entitled "Systems and Methods for Directional Antenna Power Control in a Wireless Network"; filed on Jan. 31, 2003; Jason Keith Redi et al; 54 pages.
Mauve, M. et al. A Survey on Position-Based Routing in Mobile Ad Hoc Networks. Network, IEEE. 15:6, 30-9 (2001).
Huan, Z. et al. A Besy-Tone Based DirettiOnal MAC Protocol for Ad Hoc Networks. Milcom 20002. Proceedings. IEEE vol. 2. 1233-38. (2002).
Huang, Z. et al. A Comparison Study of Omnidirectional and Directional MAC Protocols for Ad Hoc Networks. Glebal Telecommunications Conference, 2002. GLOBECOM '02. IEEE, vol. 1, 57-61 (2002).
Florens, C. et al. Scheduling Algorithms for Wireless Ad-Hoc Sensor Networks. Global Telecommunications Conference, 2002. GLOBECOM '02 IEEE. vol. 1., 6-10(2002).

Hong, X. et al. Scalable Routing Protocols for Mobile Ad Hoc Networks. Network, IEEE. 16:4,11-21. (2002).
Nasipuri, A. et al. A MAC Protocol for Mobile Ad Hoc Networks Using Directional Antennas. Wireless Communications and Networking Conference 2000. WCNC. 2000 IEEE, 3:1214-19. (2000).
Ko, Y.B. et al. Medium Access Control Protocols Using Directional Antennas in Ad Hoc Networks. INFOCOM 2000. 19th Annual Joint Conference of the IEEE Computer and Communications Societies. IEEE, 1:13-31 (2000).
Office Action dated Dec. 12, 2007, U.S. Appl. No. 10/677,945.
Office Action dated Dec. 23, 2009, U.S. Appl. No. 11/439,320.
Shurbanov et al., "Energy-Efficient Flooding in Mobile Ad-Hoc Networks", Proceedings of 23rd Annual Army Science Conference, Orlando, FL, 2 pages (2002).
Office Action dated Mar. 15, 2010, U.S. Appl. No. 12/229,039.
Office Action dated Jul. 2, 2010, U.S. Appl. No. 11/895,527.
Office Action dated Jul. 7, 2010, U.S. Appl. No. 11/439,320.
Office Action dated Aug. 3, 2010 U.S. Appl. No. 11/895,608.
Office Action dated Sep. 8, 2010 U.S. Appl. No. 12/229,039.
Office Action dated Jan. 13, 2011 U.S. Appl. No. 11/895,527.

* cited by examiner

SYSTEMS AND METHODS FOR THREE DIMENSIONAL ANTENNA SELECTION AND POWER CONTROL IN AN AD-HOC WIRELESS NETWORK

CROSS-REFERENCE TO RELATED APPLICATION

The present application is a divisional of application Ser. No. 10/355,556, entitled "Systems and Methods for Three Dimensional Antenna Selection and Power Control in an Ad-Hoc Wireless Network," filed on Jan. 31, 2003, the entirety of which is incorporated by reference herein.

GOVERNMENT CONTRACT

The U.S. Government has a paid-up license in this invention and the right in limited circumstances to require the patent owner to license others on reasonable terms as provided for by the terms of Contract No. DAAD19-01-C-0027, awarded by the Department of the Army.

FIELD OF THE INVENTION

The present invention relates generally to wireless networks and, more particularly, to systems and methods for selecting transmit antennas and controlling transmit power levels associated with the transmit antennas at nodes in such networks.

BACKGROUND OF THE INVENTION

Wireless data communication is often required in an environment where communications infrastructure, such as base stations or a wired backbone network, does not exist or is uneconomical or impractical to use. For example, in military or emergency environments, adequate infrastructure often does not exist in necessary locations and constructing such an infrastructure would be either impractical or uneconomical for the short-term use that is often required. Mobile multi-hop wireless networks have, therefore, been developed to provide wireless data communications in such environments.

In a conventional mobile wireless multi-hop network, each wireless node acts as a packet router that relays packets to other nodes in the network over an air interface link without routing the packets through any portion of a conventional cellular network, such as the wired backbone network, base station controllers, or base stations. Each wireless node, however, is limited in the distance over which it can reliably transmit, with transmission ranges of between a few feet and hundreds of feet being typical. Therefore, in communication environments that span large areas or have significant radio interference, packets transmitted from a sending node must often be hopped over multiple nodes in the wireless network to reach a destination. For such a multi-hop wireless network to perform effectively, all nodes must, therefore, be prepared to route packets on behalf of other nodes.

Conventionally, wireless ad-hoc networks employ omni-directional antennas for sending and receiving routed packet data. Use of omni-directional antennas, however, has the drawback that spatial re-use of the shared frequency space is limited. This limited spatial re-use results in lower throughput and higher latencies that reduce the performance of ad-hoc networks.

Therefore, there exists a need for systems and methods that can increase the spatial re-use of the shared frequency space associated with wireless, ad-hoc networks.

SUMMARY OF THE INVENTION

Systems and methods consistent with the present invention address this and other needs by implementing one or more directional antennas, or an omni-directional antenna, in nodes of an ad-hoc, multi-hop, wireless network. Consistent with the present invention, directional antennas, such as, for example, switched beam or steered beam types of directional antennas, may be used for transmitting and/or receiving packets. Use of directional antennas, consistent with the present invention, permits the effective division of the shared frequency space into smaller regions, thus, increasing spatial re-use in the network. Increasing the spatial re-use results in higher throughput and lower latencies in the network, as compared to exclusive use of omni-directional antennas.

Location-determining techniques, such as, for example, Global Positioning System (GPS) signals, or other techniques, may, consistent with the present invention, be employed to determine three-dimensional positions and orientations of neighboring nodes in the network. The determined locations may be used as a basis for determining headings between a transmitting and receiving node that can, in conjunction with known antenna gain patterns associated with one or more directional antennas of the transmitting and receiving nodes, be used for selecting an appropriate transmit power. The selected transmit power, thus, may ensure an adequate receive signal strength at the receiving node that accounts for the orientation of the directional antennas of the transmitting and receiving nodes relative to one another. The selected transmit power may additionally include a minimal transmit power that provides an adequate receive signal strength at the receiving node. The minimized transmit power may serve to increase spatial re-use in the system due to less noise interfering with the transmissions of other nodes.

In accordance with the purpose of the invention as embodied and broadly described herein, a method of selecting an antenna for transmitting data from a first node in an ad-hoc wireless network includes receiving a first message from a second node in the ad-hoc wireless network, the message including three-dimensional position data associated with the second node. The method further includes selecting an antenna from multiple antennas based on the three-dimensional position data and transmitting a second message from the first node to the second node via the selected antenna.

In a further implementation consistent with the present invention, a method of providing a three-dimensional position of a first node to a second node in an ad-hoc wireless network includes receiving a message, at the second node, from the first node, the message including an identifier associated with the first node and data indicating a three-dimensional position and orientation of the first node. The method further includes storing the identifier and the three dimensional position and orientation in an entry of a data table In an additional implementation consistent with the present invention, a method of determining transmit power at a first node in a wireless network includes receiving one or more messages from a second node, the one or more messages indicating a three-dimensional position of the second node and a directional antenna associated with the second node that transmitted at least one of the one or more messages. The method further includes determining a vector between the second node and the first node based on the three-dimensional position of the second node and determining a gain of the directional antenna corresponding to the determined vector to produce a transmit antenna gain (XmitAntGain). The method also includes determining the transmit power for transmitting to the second node based on the transmit antenna gain.

BRIEF DESCRIPTION OF THE DRAWINGS

The accompanying drawings, which are incorporated in and constitute a part of this specification, illustrate exemplary embodiments of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims.

The present application further relates to application Ser. No. 10/355,503, now U.S. Pat. No. 6,816,115, entitled "Systems and Methods for Antenna Selection in an Ad-Hoc Wireless Network," filed on Jan. 31, 2003, the disclosure of which is incorporated by reference herein.

The present application further relates to co-pending application Ser. No. 10/355,311, entitled "Systems and Methods for Directional Antenna Power Control in a Wireless Network," filed on Jan. 31, 2003, the disclosure of which is incorporated by reference herein.

Systems and methods consistent with the present invention provide mechanisms for implementing one or more directional antennas in nodes of an ad-hoc, multi-hop, wireless network for transmitting and/or receiving packets. In conjunction with the one or more directional antennas, position and orientation determining techniques may, consistent with the present invention, be employed to determine three-dimensional positions and orientations of neighboring nodes in the network. The determined three-dimensional locations may be used as a basis for determining headings between a transmitting and receiving node that can, in conjunction with known antenna gain patterns associated with one or more directional antennas of the transmitting and receiving nodes, be used for selecting an appropriate transmit power. The selected transmit power may ensure an adequate receive signal strength at the receiving node that accounts for the orientation of the directional antennas of the transmitting and receiving nodes relative to one another. Systems and methods, consistent with the invention, thus, permit spatial re-use gains that allow directional antennas to be used to their fullest advantage.

Exemplary Ad-Hoc Network

Figure 1:
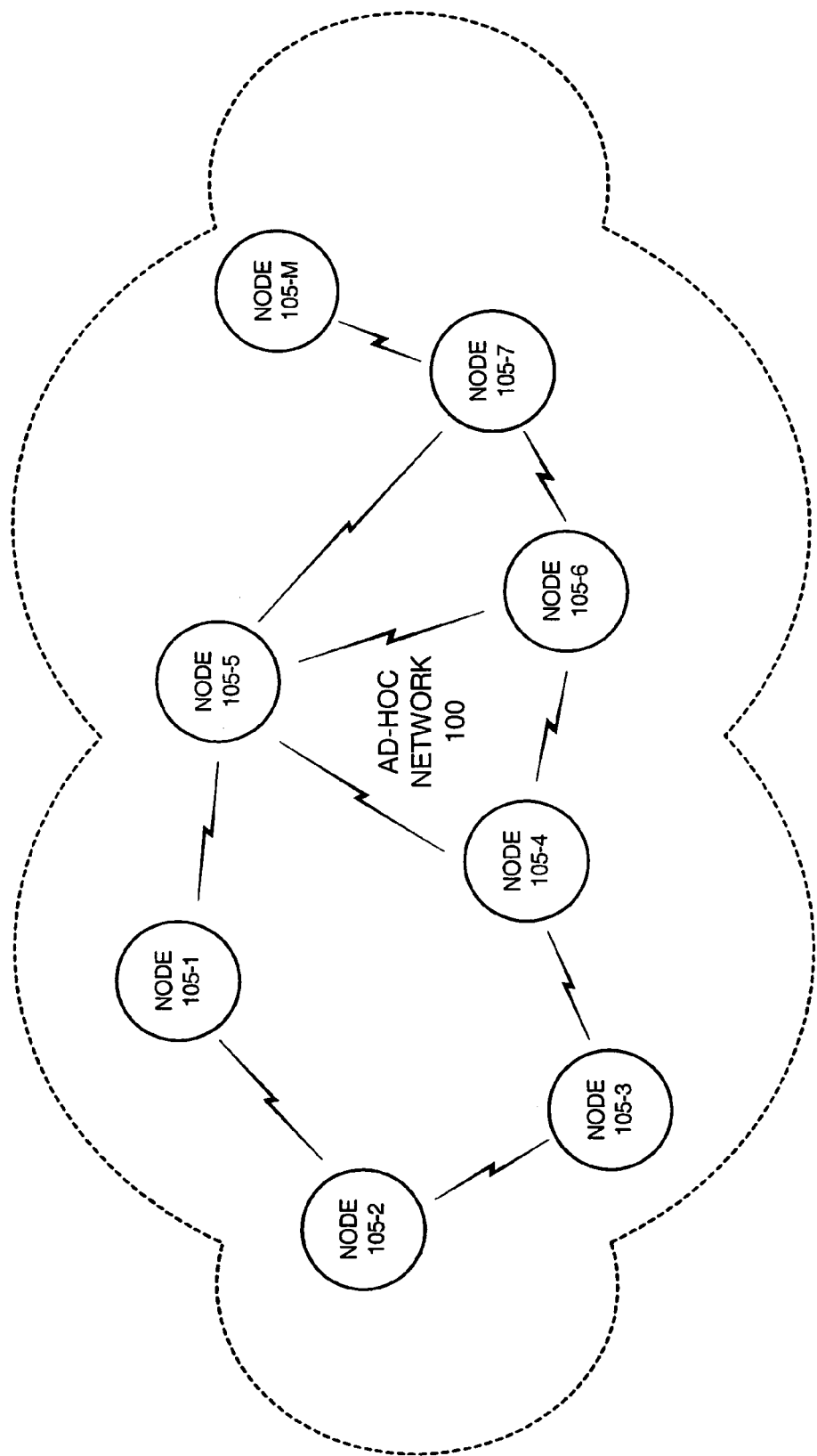
FIG. 1 illustrates an exemplary ad-hoc, multi-hop, wireless network in which systems and methods, consistent with the present invention, may be implemented.

FIG. 1 illustrates an exemplary ad-hoc, multi-hop, wireless network 100 consistent with the present invention. Network 100 may include multiple wireless nodes 105-1 through 105-M. The number of nodes shown in FIG. 1 is for illustrative purposes only. Fewer or greater numbers of nodes 105 may be employed in network 100 consistent with the present invention. Each node 105 of network 100 may route packets on behalf of other nodes and, thus, serve as an intermediate node between a packet source node and destination node in network 100. In addition to an omni-directional antenna, each node 105 may include one or more directional antennas (not shown) for transmitting and receiving packets. Alternatively, instead of using an omni-directional antenna, each node 105 may combine signals from multiple directional antennas.

Exemplary Node

Figure 2:
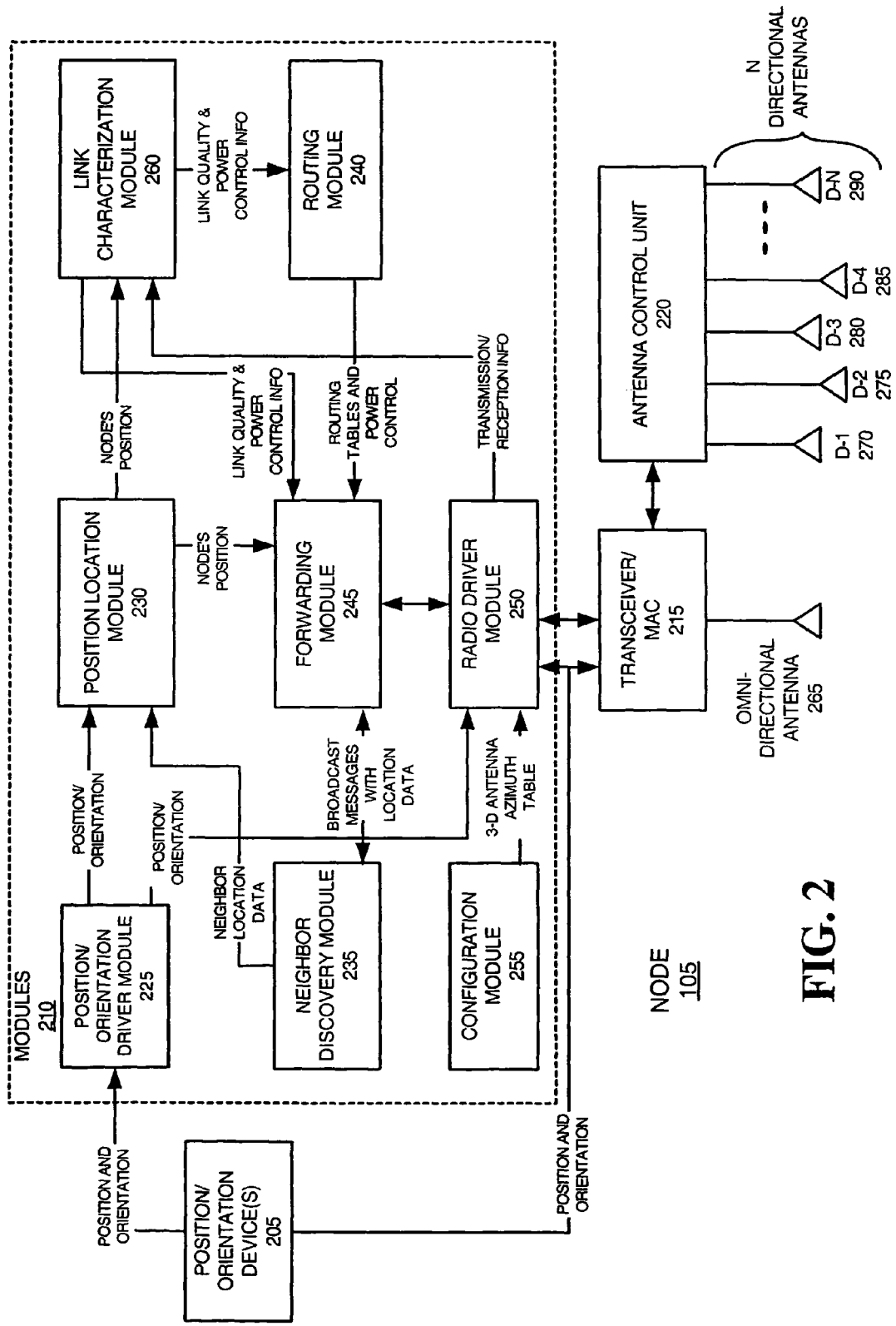
FIG. 2 illustrates exemplary components of a node of the network of FIG. 1 consistent with the present invention.

FIG. 2 illustrates exemplary components of a node 105 of network 100. Node 105 may include a position/orientation device 205, a number of modules 210, a transceiver/MAC 215, and an antenna control unit 220. Position/orientation device 205 may include one or more devices that provide position and orientation data related to node 105. Device 205 may include one or more of a GPS device, an inertial management unit, or a vehicle navigation unit that provide a latitude, longitude and altitude of node 105 and roll, pitch, yaw and a compass heading of node 105. Device 205 may provide the position and orientation data to position/orientation driver module 225. Transceiver 215/MAC may implement the media access layer (MAC) protocol and include conventional circuitry for transmitting and receiving radio signals via either omni-directional antenna 265 or the N directional antennas 270-290. Transceiver/MAC 215 may select one or more antennas of the N directional antennas 270-290 via antenna control unit 220 for transmission or reception. Transceiver/MAC 215 may also place node 105's position and orientation into messages that are to be transmitted, for example, via omni-directional antenna 265 or via a single, or multiple antennas, of N directional antennas 270-290. The messages may, for example, be transmitted via the multiple antennas of N directional antennas 270-290 in a "searchlight" or "scanning" fashion. Antenna control unit 220 may include, for example, an antenna switch for a switched beam type of directional antenna. Alternatively, antenna control unit 220 may include, for example, steering control for a steered beam type of directional antenna.

Modules 210 may include various modules, each of which may be implemented in software, hardware and/or firmware. If implemented in software, modules 210 may include instructions stored in a computer-readable medium, such as, for example, stored in or on random access memory (RAM), read only memory (ROM), a CD-ROM, or a diskette, for execution by a processing unit (not shown) such as, for example, a microprocessor. Modules 210 may include position/orientation driver module 225, position location module 230, neighbor discovery module 235, routing module 240, forwarding module 245, radio driver module 250, configuration module 255 and link characterization module 260.

Position/orientation driver module 225 may receive position and orientation data from position/orientation device 205 and may determine an altitude, latitude, and longitude and roll, pitch, yaw and a compass heading that corresponds to the position and orientation data. In addition to, or as an alternative to, conventional GPS mechanisms, module 225 may determine its location using any conventional technique for determining location. Such techniques may include, but are not limited to, determining location using conventional cellular network "E-911" location services or determining location by performing triangulation of signals transmitted by, for example, AM radio stations. Such techniques may further include a "dead reckoning" technique in which an initial location is known, and movement from that initial location may be tracked through knowledge of the distances and headings traversed from the initial location. Position location module 230 and neighbor discovery module 235 may keep track of node 105's position, and the position of other nodes 105 of network 100.

Routing module 240 may construct routing tables in accordance with network 100 routing protocols. To assist in constructing routing tables, routing module 240 may receive link quality and power control information from link characterization module 260. Forwarding module 245 may consult routing tables provided by routing module 240 to construct and forward packets to appropriate destinations via neighboring nodes of network 100.

Radio driver module 250 may (instead of transceiver/MAC 215) implement the Media Access Layer (MAC) protocol and determine the appropriate antenna of N directional antennas 270-290 for transmitting outgoing packets. Configuration module 255 may store data for configuring radio driver module 250. Such data may include, for example, one or more data tables that indicate the orientation of the N antennas 270-290 relative to node 105's platform. Link characterization module 260 may determine link quality and power control information related to transmitting and receiving packets to and from neighboring nodes of network 100.

Exemplary Directional Antenna Gain Pattern

Figure 3:
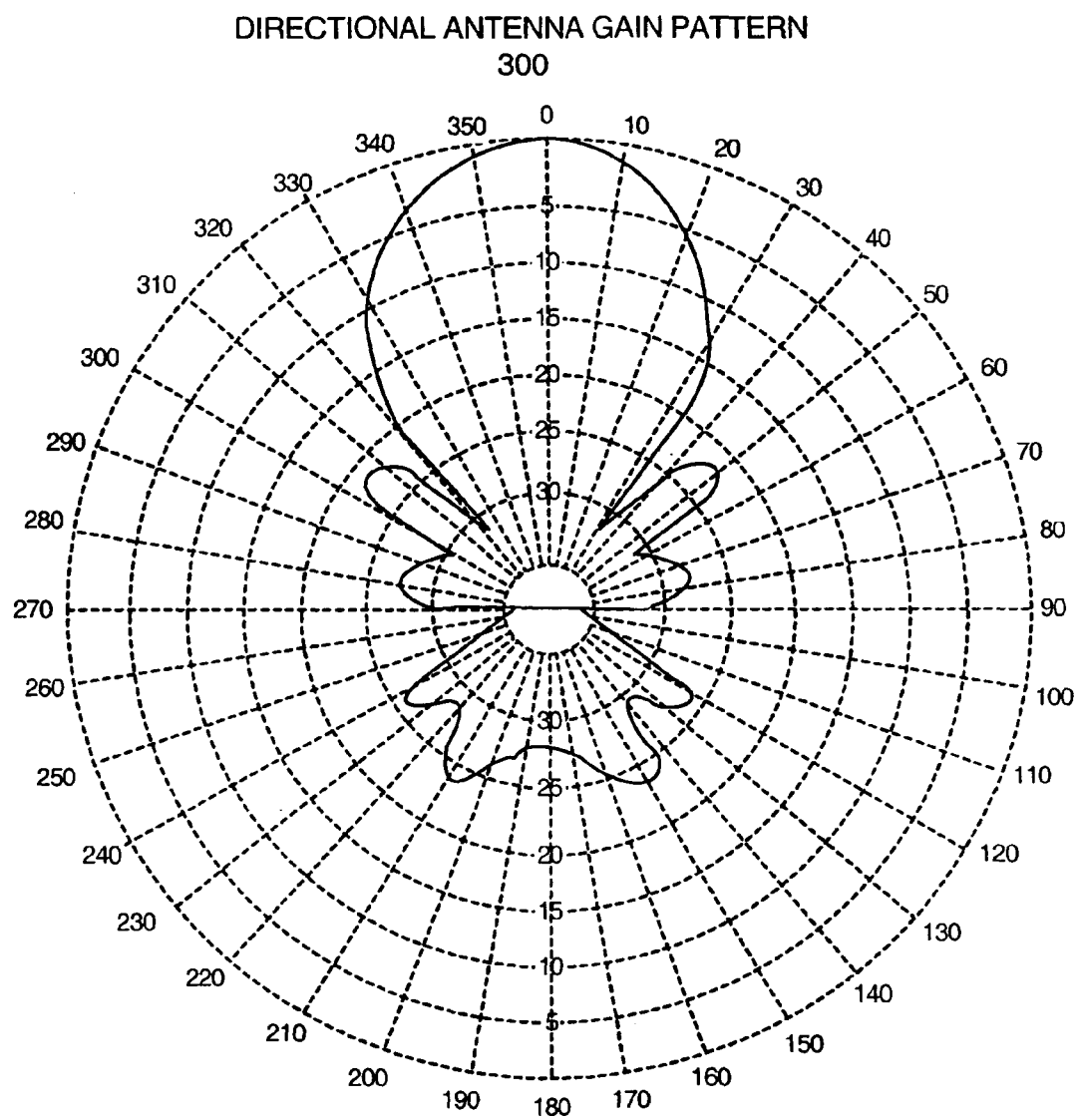
FIG. 3 illustrates an exemplary antenna gain pattern associated with a directional antenna of the node of FIG. 2.

FIG. 3 illustrates an exemplary directional antenna gain pattern 300 consistent with the present invention. Antenna gain pattern 300 represents a graphical representation of the gain of a directional antenna of N directional antennas 270-290 associated with each node 105 of network 100 at a particular elevation (e.g., 0 degrees elevation shown). As will be recognized in the art, antenna gain pattern 300 indicates the gain of a directional antenna as a function of an angle relative to the directional antenna. Antenna gain pattern 300, thus, indicates a transmit and receive gain associated with a corresponding directional antenna at a full 360 degrees surrounding a directional antenna at a particular elevation.

Exemplary Antenna to Platform Azimuth/Elevation Table

Figure 4:
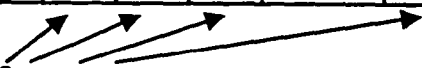
FIGS. 4-7 illustrate exemplary data tables associated with each node of FIG. 1 consistent with the present invention.

FIG. 4 illustrates an exemplary table 400 that indicates, consistent with the present invention, the orientation of each of the N directional antennas 270-290 relative to a platform of a node 105. Table 400 may be stored in a memory device associated with a node 105. Table 400 may include multiple entries 405, each of which may include an antenna number 410, an antenna type 415, a platform azimuth minimum 420, a platform azimuth maximum 425, a platform azimuth center 430, a platform elevation minimum 435, a platform elevation maximum 440 and a platform elevation center 445. Antenna number 410 may include a value that uniquely identifies an antenna of N directional antennas 270-290. Antenna type 415 may indicate a type of the antenna identified by antenna number 410.

Platform azimuth minimum 420 and platform azimuth maximum 425 may represent the range of the antenna gain pattern (i.e., as shown in FIG. 3) associated with the antenna identified by antenna number 410. This range may not necessarily represent the 3 dB main lobes of the antenna gain pattern, but may represent an approximate range of azimuth values appropriate for transmitting a packet. Platform azimuth minimum 420 may include an angle (e.g., degrees or radians), referenced to node 105's platform, that indicates a minimum angle of an antenna gain pattern associated with the antenna identified by antenna number 410. Platform azimuth maximum 425 may include an angle, referenced to node 105's platform, that indicates a maximum angle of the antenna gain pattern associated with the antenna identified by antenna number 410. Platform azimuth minimum 420 and platform azimuth maximum 425 values associated with all the entries of table 400 may include gaps in coverage of the N directional antennas 270-290. In the case of gaps in antenna coverage, node 105 may use omni-directional antenna 265 for transmitting and/or receiving packets. Platform azimuth center 430 may indicate a center angle that describes the direction the antenna identified by antenna number 410 is pointing relative to node 105's platform. Platform elevation minimum 435 may include an angle referenced to node 105's platform, that indicates a minimum elevation angle of the antenna gain pattern associated with the antenna identified by antenna number 410. Platform elevation maximum 440 may include an angle referenced to node 105's platform that indicates a maximum elevation angle of the antenna gain pattern associated with the antenna identified by antenna number 410. Platform elevation center 445 may include an angle referenced to node 105's platform that indicates a central elevation angle of the antenna gain pattern.

Exemplary Neighbor Position/Orientation Table

Figure 5:

FIG. 5 illustrates an exemplary table 500 that indicates, consistent with the present invention, a heading associated with each of the neighboring nodes of a node 105 of network 100. Table 500 may be stored in a memory device associated with a node 105. Table 500 may include multiple entries 505, each of which may include a neighbor identifier 510, a northing value 515, an easting value 520, an altitude value 525, a heading 530, a pitch value 535 and a roll value 540. Neighbor identifier 510 may uniquely identify a neighboring node 105 of network 100. Neighbor identifier 510 may, for example, include a MAC address associated with a neighboring node. Northing value 515 may include a reference latitude subtracted from the latitude of the node identified by neighbor identifier 510. Easting value 520 may include a reference longitude subtracted from the longitude of the node identified by neighbor identifier 510. Altitude value 525 may include an altitude at which the node identified by neighbor identifier 510 resides. Heading 530 may include a compass heading associated with a direction in which the node identified by neighbor identifier 510 may be traveling. Pitch 535 may indicate a pitch value associated with the platform of the node identified by neighbor identifier 510. Roll 540 may indicate a roll value associated with the platform of the node identified by neighbor identifier 510. Entries 505 of table 500 may be aged based on the time a previous update for each entry was received. The aging of each entry 505 may occur according to a configurable timer.

Exemplary Antenna Gain Table

Figure 6:
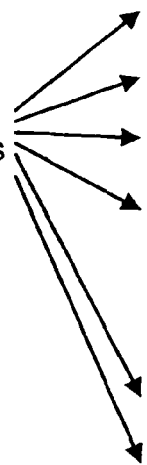

FIG. 6 illustrates an exemplary antenna gain table 600 associated with a directional antenna of N directional antennas 270-290 of a node 105. Antenna gain table 600 may be stored in a memory device associated with a node 105. Antenna gain table 600 may include one or more entries 605, each of which may include an antenna type 610, an angle relative to center 615, an antenna gain 620, and an elevation 625. Antenna type 610 may indicate a type of an antenna of N directional antennas 270-290. Angle relative to center 615 may indicate an angle, either clockwise or counterclockwise, relative to a designated center angle of the antenna corresponding to the type of antenna designated by antenna type 610. Antenna gain 620 may indicate a gain of the antenna that corresponds to the type of antenna designated by antenna type 610 at the entry 605's angle relative to center 615. Elevation 625 may indicate an elevation angle relative to a reference plane through the antenna identified by antenna type 600, at which the antenna gains 620 are effective.

Exemplary Neighbor Transmit Power Table

Figure 7:
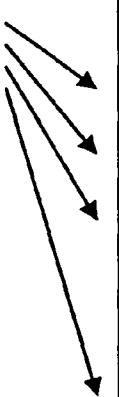

FIG. 7 illustrates an exemplary table 700 for determining a transmit power for transmitting to a neighboring node 105 of network 100. Table 700 may be stored in a memory device associated with a node 105 that neighbors each of the nodes identified in table 700. Table 700 may include one or more entries 705, each of which may include a neighbor identifier 710 and a transmit (Xmit) power value 715. Neighbor identifier 710 may uniquely identify a neighboring node 105 of network 100. Neighbor identifier 710 may, for example, include a MAC address associated with a neighboring node. Xmit power value 715 may indicate a power level for transmitting data to a neighboring node 105 of network 100 designated by neighbor identifier 710.

Exemplary Node Location Transmission Process

Figure 8:
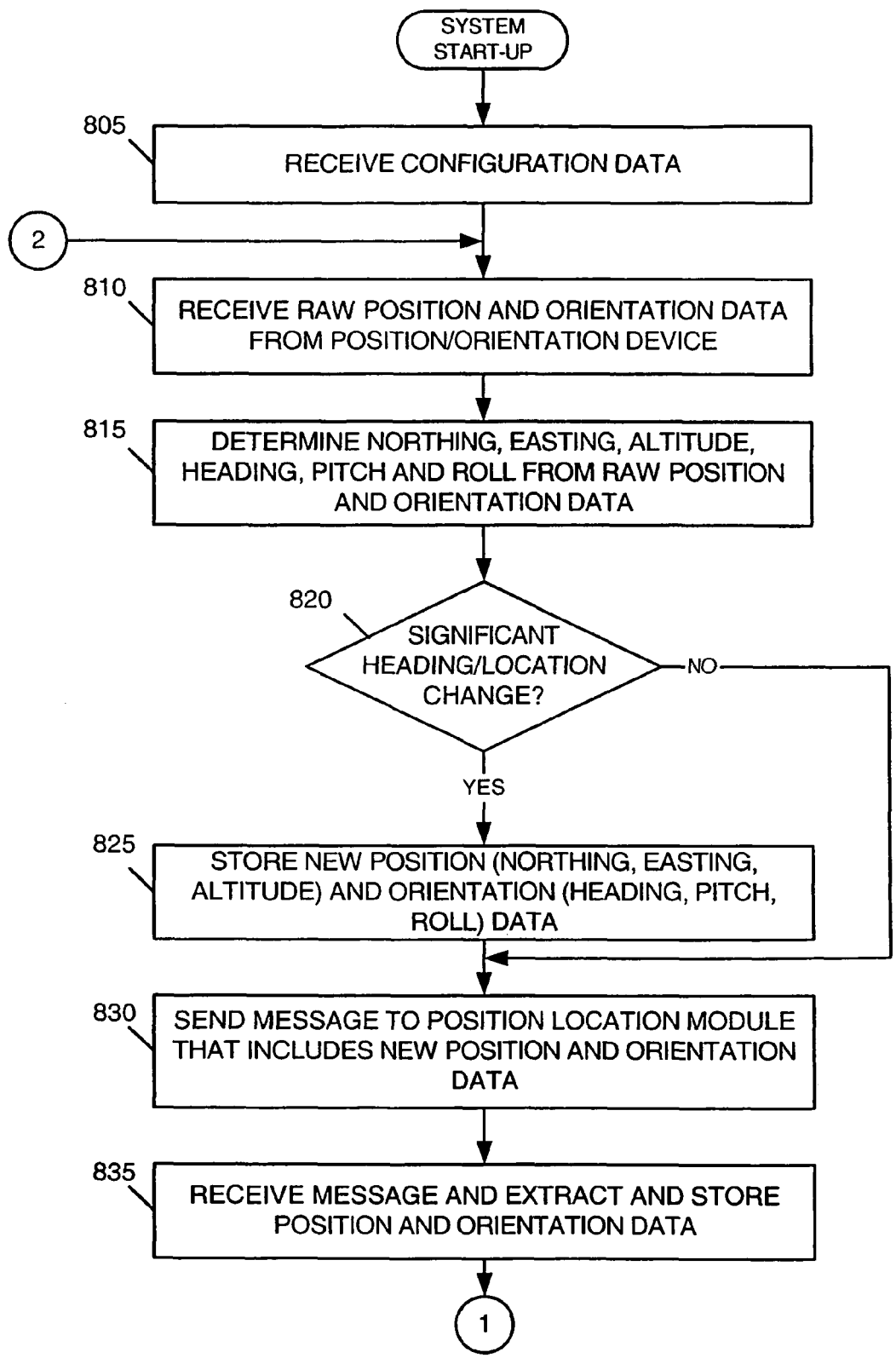
FIGS. 8-9 are flow charts that illustrate a node location transmission process consistent with the present invention.
Figure 9:
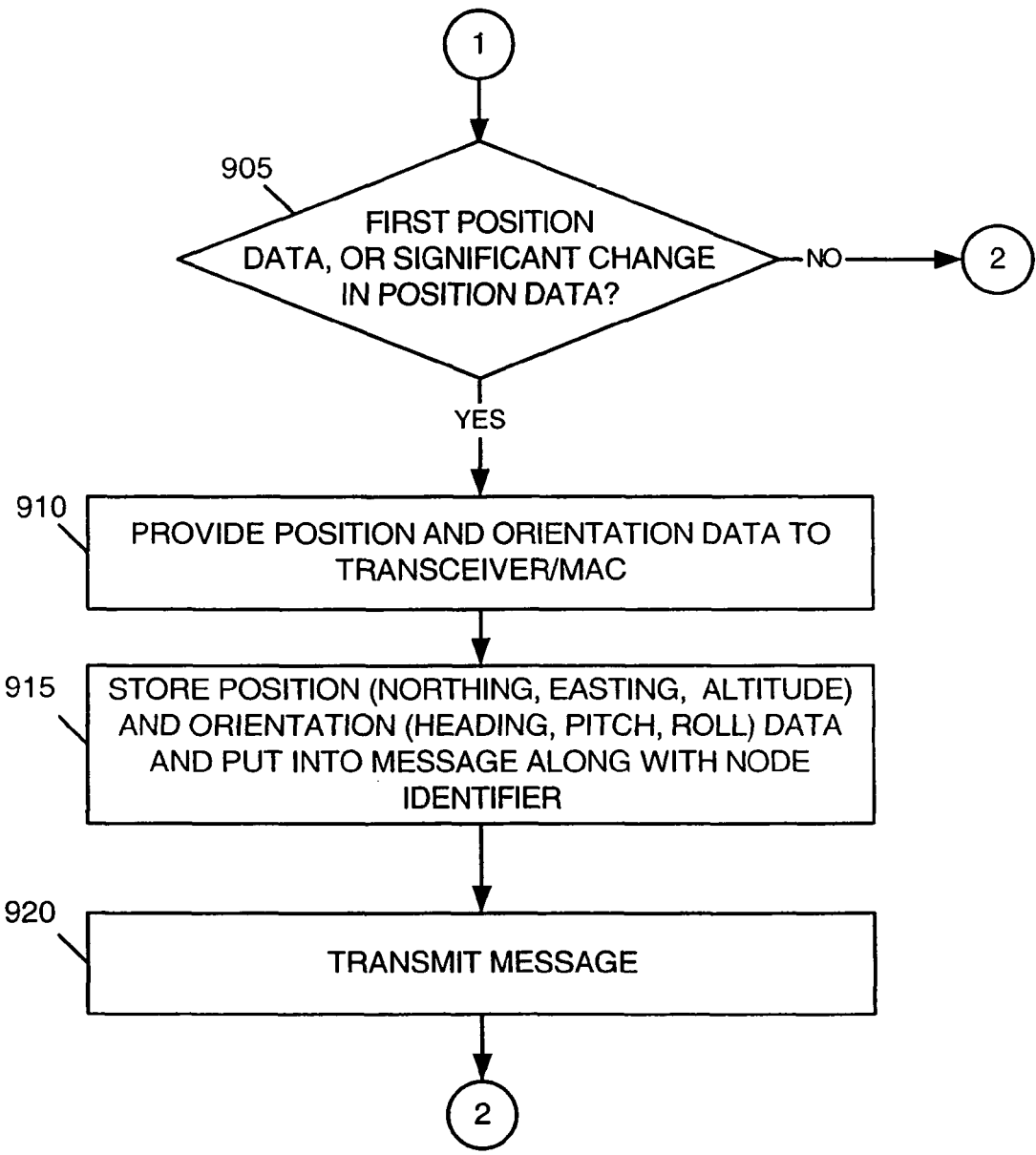

FIGS. 8-9 are flowcharts that illustrate an exemplary process, consistent with the present invention, for transmitting a current location of a node 105. As one skilled in the art will appreciate, the process exemplified by FIGS. 8-9 can be implemented as a sequence of instructions and stored in a memory associated with node 105 for execution by a processing unit. Alternatively, the process exemplified by FIGS. 8-9 can be implemented in hardware and/or firmware.

The exemplary process may begin with receipt of configuration data [act 805]. Position/orientation driver module 225 may receive the configuration data from position location module 230. The configuration data may include, for example, an indication of how often position/orientation driver module 225 should provide position and orientation data to position location module 230. Position/orientation driver module 225 may then periodically receive raw position and orientation data from position/orientation device 205 [act 810]. The raw position data may include latitude, longitude, and altitude data. Position/orientation driver module 225 may determine altitude (X), easting (Y), northing (Z), heading (psi), pitch (theta), and roll (phi) values from the raw position and orientation data [act 815]. Northing and easting values may be determined from the latitude and longitude data relative to a reference latitude and longitude as follows:

$$\text{northing}=(\text{latitude}-\text{ref\_latitude})*111319 \qquad \text{Eqn. (1)}$$

$$\text{easting}=(\text{longitude}-\text{ref\_longitude})*\cos(\text{latitude}) \qquad \text{Eqn. (2)}$$

where there are 111,319 meters per degree of latitude and 111,319*cos(latitude) meters per degree of longitude and the reference latitude (ref_latitude) and longitude (ref_longitude) may be an arbitrarily selected global point. The northing and easting values, that are relative to the reference latitude and longitude, can be used instead of absolute global latitude and longitude values to reduce the size of the stored values, thus, reducing the demand on memory storage capacity. From the determined position and orientation data, position/orientation driver module 225 may determine whether there has been a significant heading change, or a significant change in position (i.e., significant change in altitude, easting or northing) for node 105 [act 820]. If not, the exemplary process may continue at act 830 below. If there has been a significant heading or position change, then position/orientation driver module 225 may store the position and orientation in memory [act 825]. Position/orientation driver module 225 may then send a message to position location module 230 that includes the new position and orientation data (e.g., altitude, easting, northing, heading, pitch, roll) [act 830]. Position location module 230 may receive the message and extract and store the position and orientation data [act 835].

Position location module 230 may determine whether the extracted position and orientation data is the first received position and orientation data after system start-up, or whether the extracted position and orientation data represents a significant change in the position or orientation of node 105 [act 905](FIG. 9). If not, the exemplary process may return to act 810 above. If the position and orientation data is the first received position and orientation data, or represents a significant change in node 105's position or orientation, then position location module 230 may provide the position (altitude, easting, northing) and orientation (heading, pitch, roll) data to radio driver module 250, which passes the data on to transceiver MAC 215 [act 910]. Transceiver/MAC 215 may store the position and orientation data and put the data into a message along with node 105's node identifier [act 915]. Transceiver/MAC 215 may then transmit the message via omni-directional antenna 265, or via one, or multiple, antennas of N directional antennas 270-290 [act 920]. In some exemplary embodiments, the outgoing message may be transmitted via each directional antenna of N directional antennas 270-290 in a search light fashion. The outgoing message may include a message dedicated to carrying only location data (i.e., a location message). The outgoing message may further include any type of outgoing message, such as, for example, a data message, a Request-To-Send (RTS), a Clear-To-Send (CTS), or a network control message, onto which the location data and node identifier are "piggybacked."

Exemplary Neighbor Node Position/Orientation Determination Process

Figure 10:
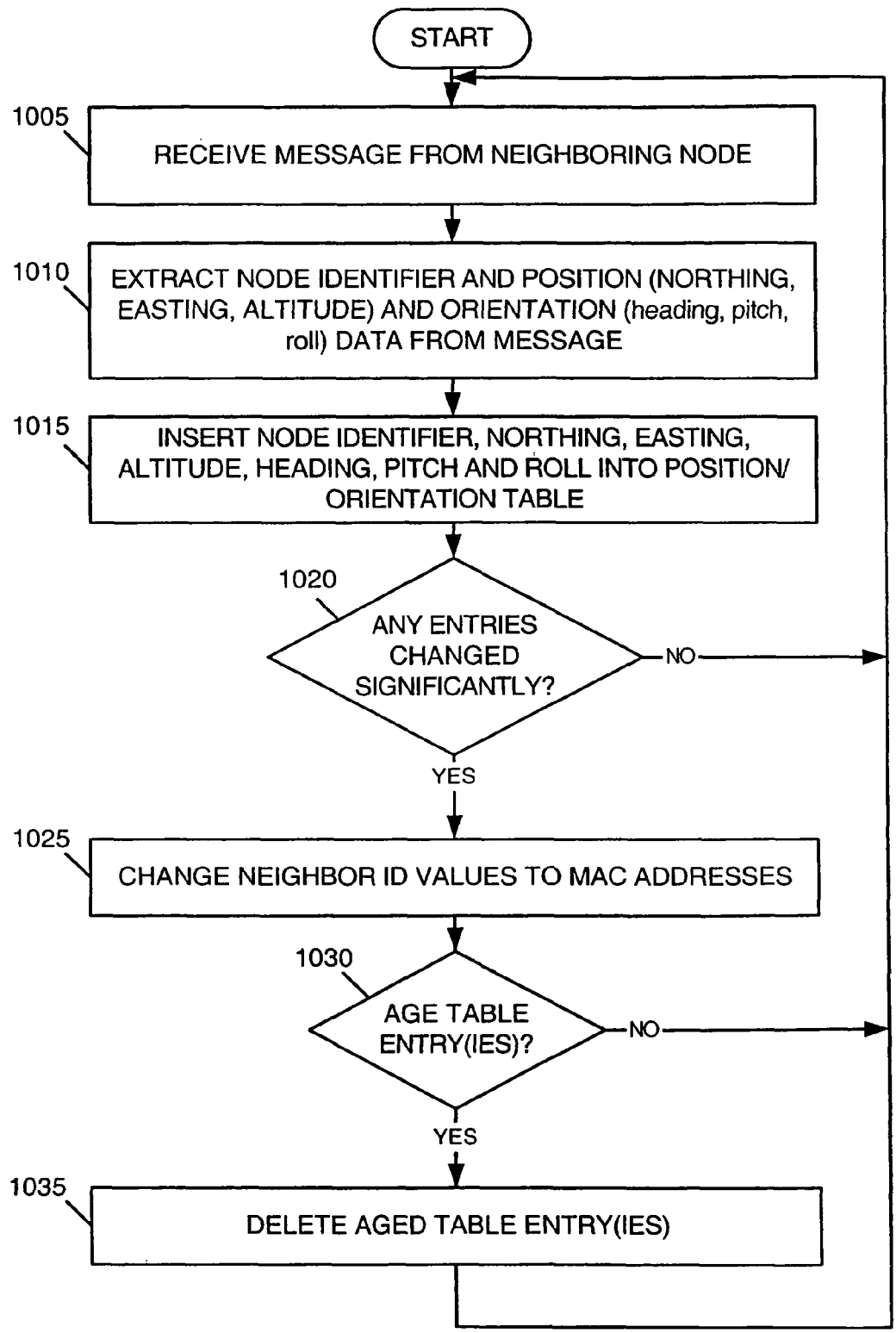
FIG. 10 is a flow chart that illustrates an exemplary process for determining a three-dimensional position and orientation of a neighbor node consistent with the present invention.

FIG. 10 is a flowchart that illustrates an exemplary process, consistent with the present invention, for determining a position and orientation of a neighbor node. As one skilled in the art will appreciate, the process exemplified by FIGS. 10-11 can be implemented in the MAC functionality of transceiver/MAC 215 as a sequence of instructions stored in a memory and executed by a processing unit. Alternatively, the process exemplified by FIGS. 10-11 can be implemented in hardware and/or firmware.

The exemplary process may begin with the receipt of a message from a neighboring node 105 of network 100 that contains the neighboring node 105's position and orientation [act 1005]. The message may include a dedicated position data message, a data message, a Request-to-send (RTS), a Clear-to-Send (CTS), or a network control message with node identifier and location data "piggybacked" on the message. Transceiver/MAC 215 may receive the message and extract a node identifier and position (altitude, easting, northing) and orientation (heading, pitch, roll) data from the message [act 1010]. Transceiver/MAC 215 may further insert the node identifier, northing, easting, altitude, heading, pitch and roll values into an entry 505 of neighbor position/orientation table 500 as neighbor ID 510, northing 515, easting 520, altitude 525, heading 530, pitch 535 and roll 540, respectively

[act 1015]. Transceiver/MAC 215 may determine whether any entries of table 500 have changed significantly [act 1020]. If so, the exemplary process may continue at act 1025. If no entries of table 500 have changed significantly, then the exemplary process may return to act 1005 above. Transceiver/MAC 215 may change the neighbor identifier values 510 of table 500 into corresponding MAC addresses [act 1025]. Transceiver/MAC 215 may further determine whether to age any entries 505 of table 500 [act 1030]. Transceiver/MAC 215 may use a configurable timer associated with each entry 505 of table 500 for determining whether to age each entry 505. If any entries 505 of table 500 are to be aged, transceiver/MAC 215 may delete the aged table entries of table 505 [act 1035].

Exemplary 3-D Antenna Selection Process

Figure 11:
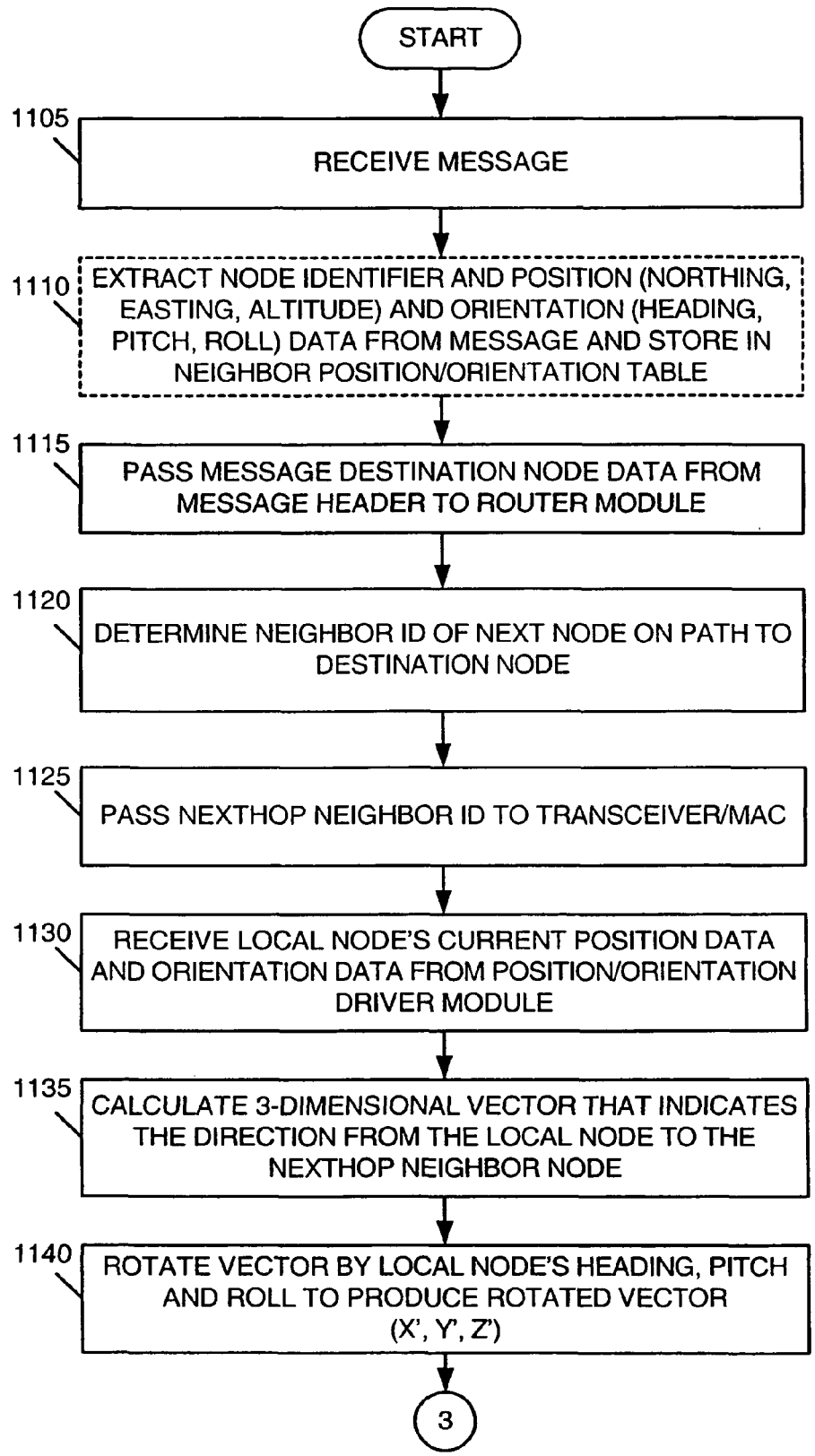
FIGS. 11-12 are flow charts that illustrate an exemplary process for selection of an antenna for transmitting data to a neighboring node consistent with the present invention.
Figure 12:
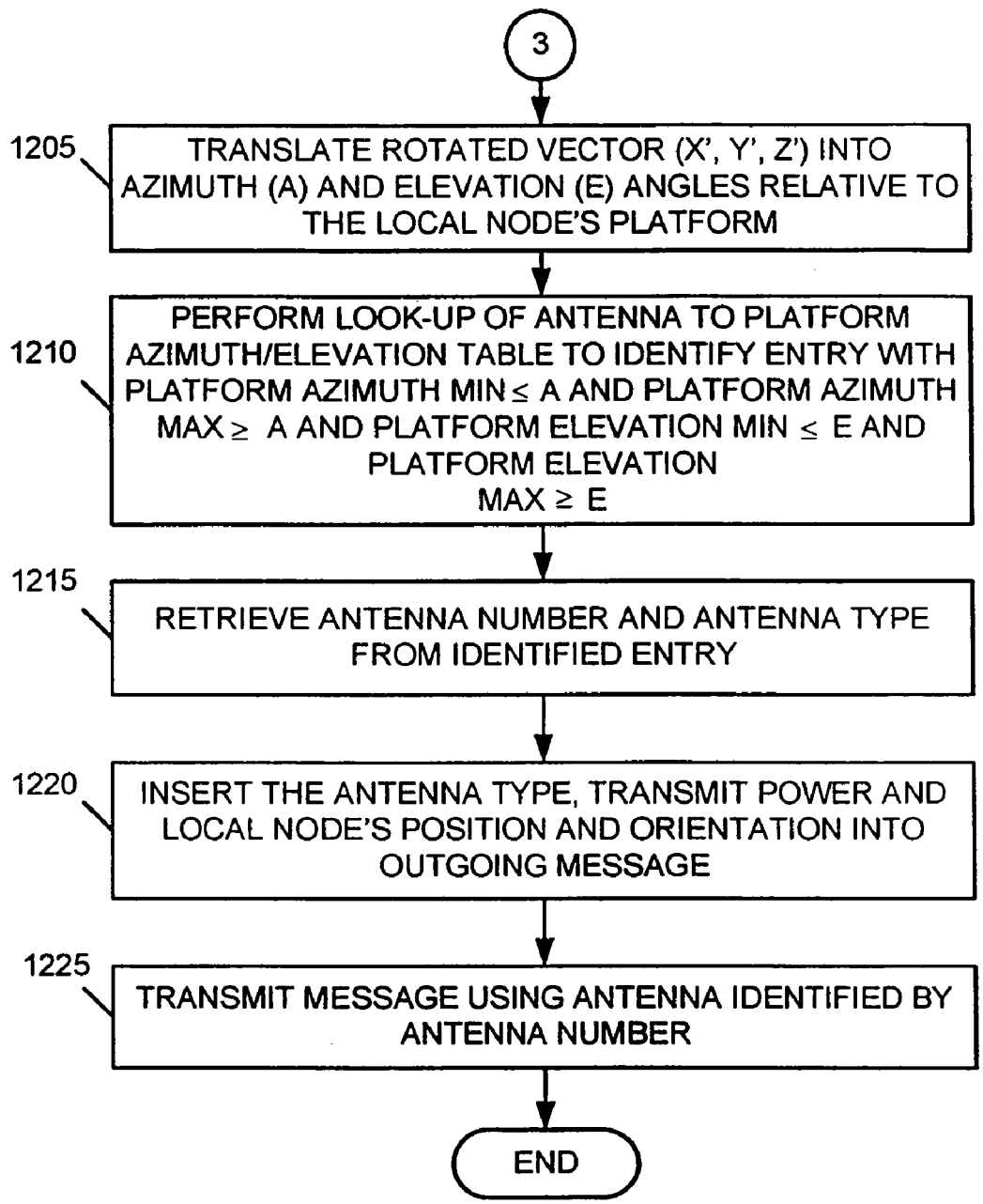

FIGS. 11-12 are flowcharts that illustrate an exemplary process, consistent with the present invention, for selection of an antenna for transmitting to a neighboring node 105 of network 100 via a directional antenna of N directional antennas 270-290. As one skilled in the art will appreciate, the method exemplified by FIGS. 11-12 can be implemented as a sequence of instructions and stored in a memory associated with a node 105 for execution by a processing unit. Alternatively, the process exemplified by FIGS. 11-12 can be implemented in hardware and/or firmware. Unless otherwise indicated, the exemplary acts of FIGS. 11-12 may be implemented by the MAC functionality of transceiver/MAC 215 of node 105. In some embodiments, however, the exemplary acts of FIGS. 11-12 may be implemented by one or more other modules 210 of node 105.

The exemplary three-dimensional antenna selection process may begin with the receipt of a message from a neighboring node 105 of network 100 [act 1105]. A node identifier and position (e.g., altitude, easting, northing) and orientation (e.g., heading, pitch, roll) data may, optionally, be extracted from the received message and stored in neighbor position/orientation table 500 [act 1110]. The message's destination node data, from the message header, may be passed from radio driver module 250 and on to forwarding module 245. Forwarding module 245 may, using routing tables received from routing module 240, determine a neighbor identifier of a nexthop node on a path to the message's destination node [act 1120]. Forwarding module 245 may pass the determined nexthop neighbor identifier to transceiver/MAC 215 via radio driver module 250 [act 1125]. Transceiver/MAC 215 may then retrieve the local node's current position (e.g., altitude, easting, northing) and orientation (heading, pitch, roll) data from position/orientation driver module 225 [act 1130].

Transceiver/MAC 215 may calculate a three-dimensional vector (X, Y, Z) that indicates a direction from the local node to the nexthop neighbor node [act 1135] using the local node's position data ($X_{local}$, $Y_{local}$, $Z_{local}$) and the nexthop neighbor node's position data ($X_{nexthop}$, $Y_{nexthop}$, $Z_{nexthop}$). The three-dimensional vector may be calculated using the following:

$$X = X_{nexthop} - X_{local} \quad \text{Eqn. (3)}$$

$$Y = Y_{nexthop} - Y_{local} \quad \text{Eqn. (4)}$$

$$Z = Z_{nexthop} - Z_{local} \quad \text{Eqn. (5)}$$

where
$X_{nexthop}$ is the nexthop node's altitude,
$Y_{nexthop}$ is the nexthop node's easting,
$Z_{nexthop}$ is the nexthop node's northing,
$X_{local}$ is the local node's altitude,
$Y_{local}$ is the local node's easting,
$Z_{local}$ is the local node's northing.

The calculated 3-D vector may then be rotated by the local node's heading (psi), pitch (theta) and roll (phi) angles [act 1140], to produce a rotated vector (X', Y', Z') according to the following:

$$X' = X(\cos(\text{roll})*\cos(\text{pitch})) + Y(-(\cos(\text{roll})*\sin(\text{pitch})*\sin(\text{heading})) + (\sin(\text{roll})*\cos(\text{heading}))) + Z(-(\cos(\text{roll})*\sin(\text{pitch})*\cos(\text{heading})) - (\sin(\text{roll})*\sin(\text{heading}))) \quad \text{Eqn. (6)}$$

$$Y' = X(-(\sin(\text{roll})*\cos(\text{pitch}))) + Y((\sin(\text{roll})*\sin(\text{pitch})*\sin(\text{heading})) + (\cos(\text{roll})*\cos(\text{heading}))) + Z((\sin(\text{roll})*\sin(\text{pitch})*\cos(\text{heading})) - (\cos(\text{roll})*\sin(\text{heading}))) \quad \text{Eqn. (7)}$$

$$Z' = X(\sin(\text{pitch})) + Y((\cos(\text{pitch})*\sin(\text{heading})) + Z((\cos(\text{pitch})*\cos(\text{heading})) \quad \text{Eqn. (8)}$$

The rotated vector (X', Y', Z') may then be translated into azimuth (A) and elevation (E) angles relative to the local node's platform [act 1205](FIG. 12) according to the following:

$$A = \text{atan } 2(Y'/Z') \quad \text{Eqn. (9)}$$

$$E = \text{atan } 2(X'/(\text{sqrt}(Z'*Z'+Y'*Y'))) \quad \text{Eqn. (10)}$$

where arctan 2(y,x) is a known function that determines the arctangent of y/x, with the sign of both of the arguments x and y being used to determine the quadrant of the result. The result of the function is a value in radians between −π and π. A look-up of antenna to platform azimuth/elevation table 400 may then be performed to identify an entry 405 with platform azimuth min 420≦A and platform azimuth max 425≧A and platform elevation min 435≦E and platform elevation max 440≧E [act 1210]. An antenna number 410 and antenna type 415 may be retrieved from the identified entry 405 [act 1215]. The retrieved antenna type 415, transmit power and the local node's position (altitude, easting, northing) and orientation (heading, pitch, roll) may be inserted into the outgoing message [act 1220]. The message may be transmitted to the nexthop neighbor using a directional antenna of N directional antennas 270-290 identified by the retrieved antenna number 410 [act 1225].

Exemplary 3-D Transmit Power Determination Process

Figure 13:
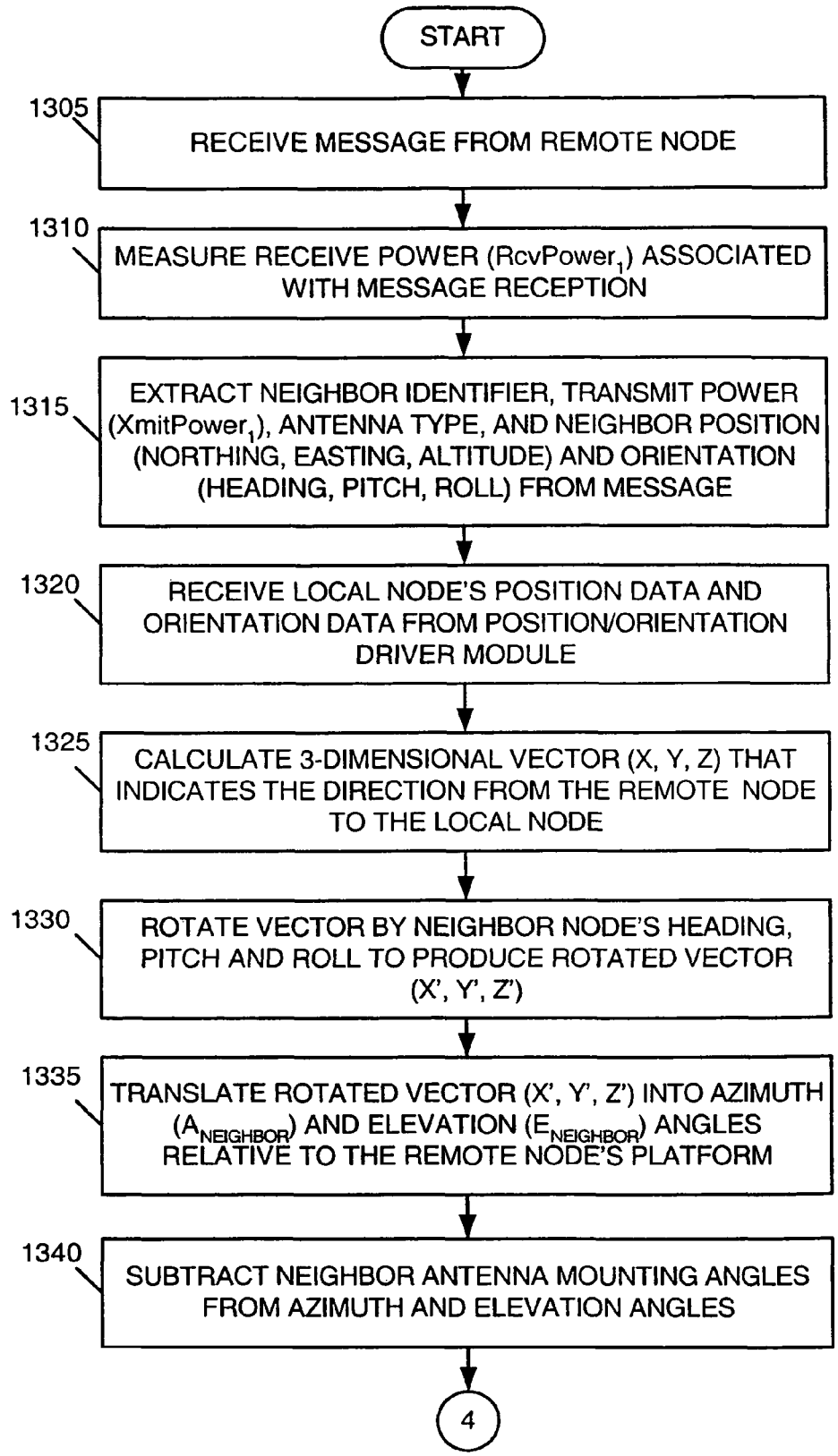
FIGS. 13-15 are flow charts that illustrate an exemplary process for determination of a transmit power for transmitting data to a neighboring node consistent with the invention.
Figure 14:
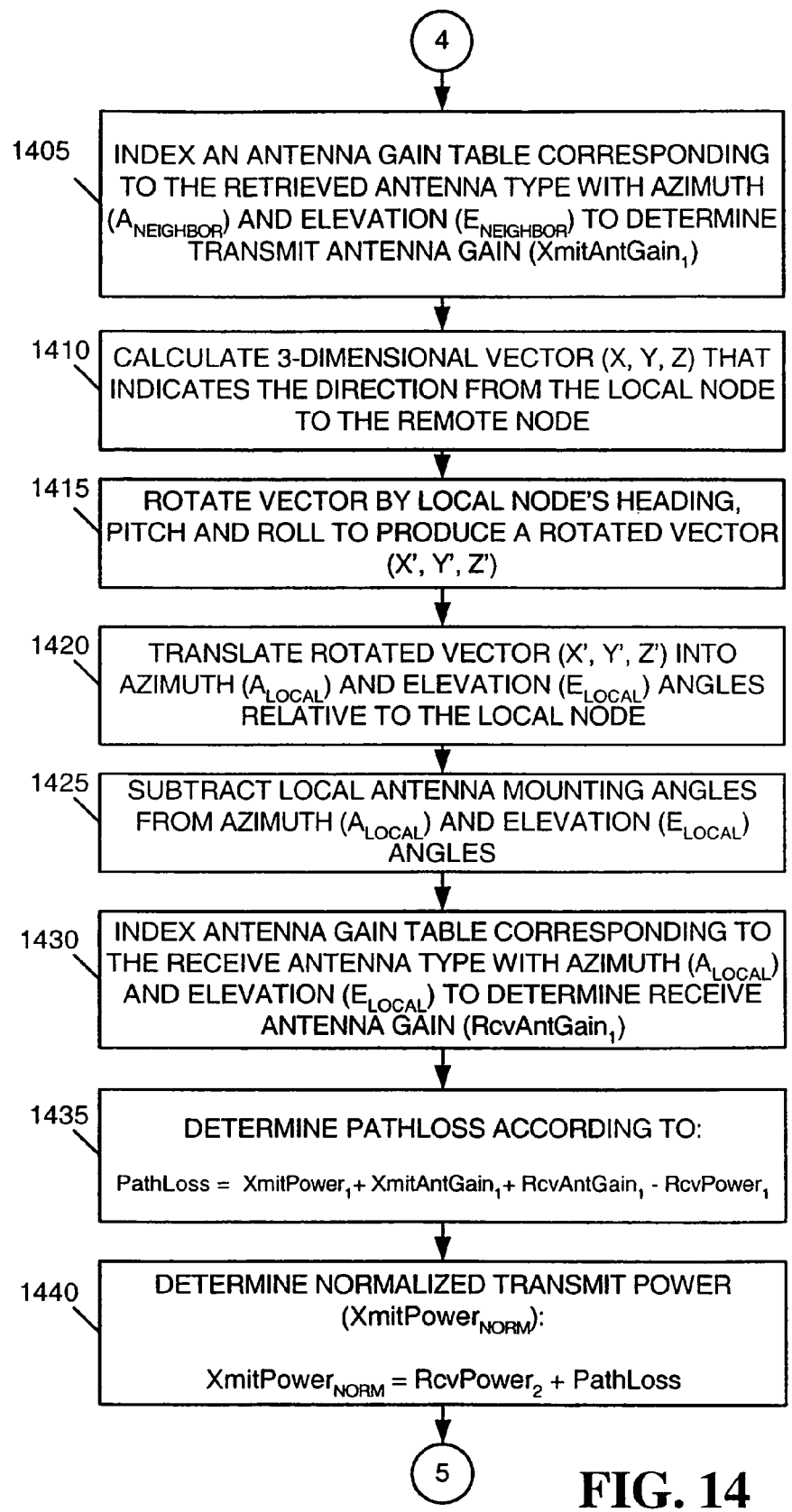
Figure 15:
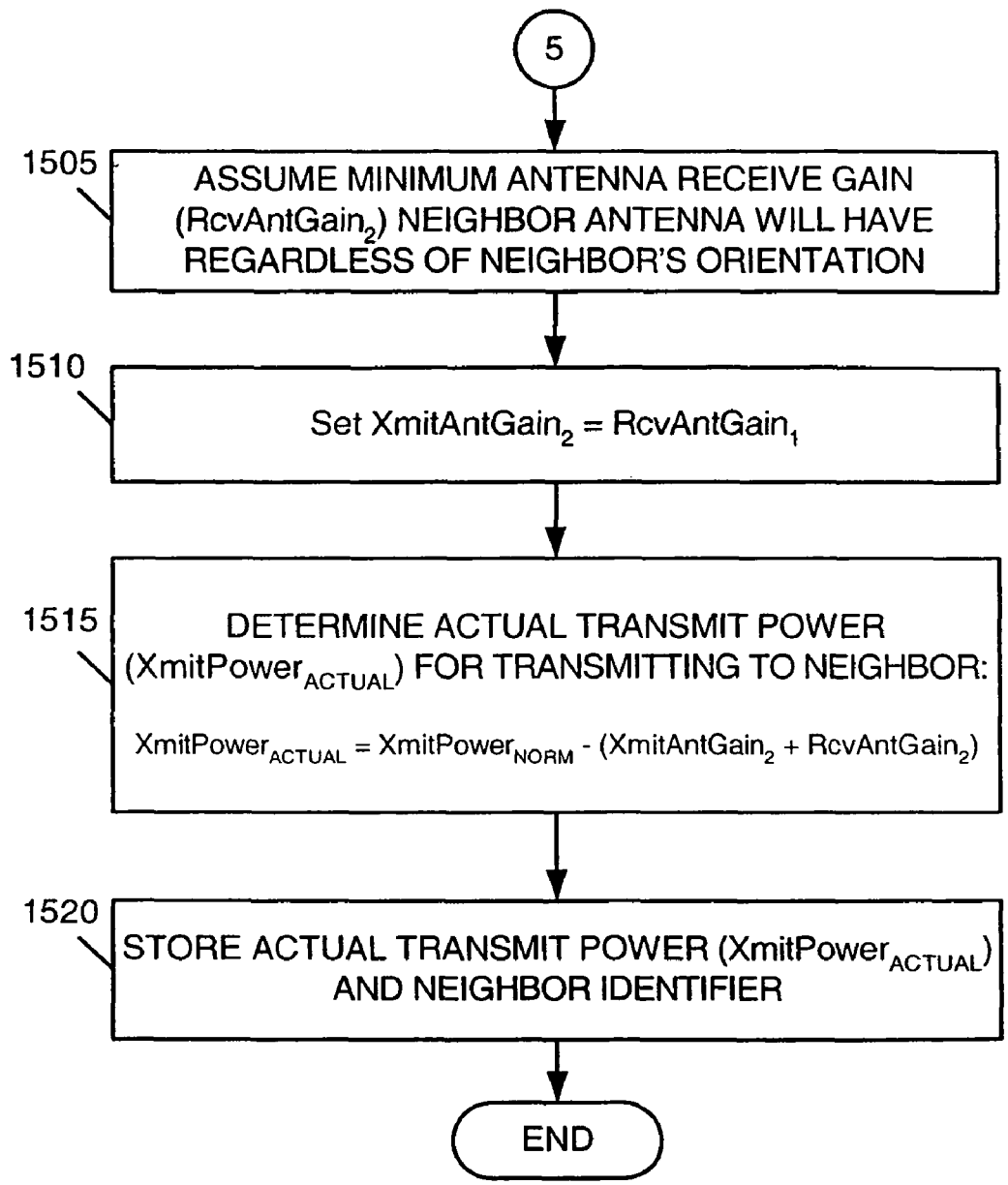

FIGS. 13-15 are flowcharts that illustrate an exemplary process, consistent with the present invention, for determination of a transmit power for transmitting to a neighboring node 105 of network 100 via a directional antenna of N directional antennas 270-290. As one skilled in the art will appreciate, the method exemplified by FIGS. 13-15 can be implemented as a sequence of instructions and stored in a memory associated with a node 105 for execution by a processing unit. Alternatively, the process exemplified by FIGS. 13-15 can be implemented in hardware and/or firmware. Unless otherwise indicated, the exemplary acts of FIGS. 13-15 may be implemented by the MAC functionality of transceiver/MAC 215 of node 105. In some embodiments, however, the exemplary acts of FIGS. 13-15 may be implemented by one or more other modules 210 of node 105.

The exemplary process may begin with the receipt of an incoming message from a neighboring node 105 of network 100 at transceiver/MAC 215 [act 1305]. A receive power level ($\text{RcvPower}_1$) associated with the received message may be measured [act 1310]. Transceiver/MAC 215 may, for example, measure the receive power level and provide the receive power level to link characterization module 260. A neighbor identifier, transmit power (XmitPower$_1$), antenna type, neighbor position (altitude, easting, northing) and orientation (heading, pitch, roll) may be extracted from the received packet [act 1315]. The neighbor identifier may identify the neighboring node 105 which sent the message, the transmit power may indicate the power level that that was put into the transmitting antenna (the effective power out of the antenna may be dependent on the antenna's gain) for transmitting the message, the antenna type may indicate a type of the antenna which transmitted the message, and the position and orientation may indicate the global position of the neighboring node 105 and the orientation of its platform. The local node's current position data (X$_{local}$, Y$_{local}$, Z$_{local}$) and orientation data (heading$_{local}$, pitch$_{local}$, roll$_{local}$) may be received from position/orientation driver module 225 [act 1320]. A three-dimensional vector (X, Y, Z) may be calculated that indicates a direction from the remote neighboring node to the local node receiving the message [act 1325] using the local node's position data (X$_{local}$, Y$_{local}$, Z$_{local}$) and the neighbor node's position data (X$_{neighbor}$, Y$_{neighbor}$, Z$_{neighbor}$). The three-dimensional vector may be calculated using the following:

$$X = X_{local} - X_{neighbor} \quad \text{Eqn. (11)}$$

$$Y = Y_{local} - Y_{neighbor} \quad \text{Eqn. (12)}$$

$$Z = Z_{local} - Z_{neighbor} \quad \text{Eqn. (13)}$$

where
X$_{local}$ is the local node's altitude,
Y$_{local}$ is the local node's easting,
Z$_{local}$ is the local node's northing,
X$_{neighbor}$ is the neighbor node's altitude,
Y$_{neighbor}$ is the neighbor node's easting, and
Z$_{neighbor}$ is the neighbor node's northing.

The calculated 3-D vector may then be rotated by the remote neighbor node's heading (psi), pitch (theta) and roll (phi) angles [act 1330], to produce a rotated vector (X', Y', Z') according to the following relations:

$$X' = X(\cos(\text{roll}) * \cos(\text{pitch})) + Y(-(\cos(\text{roll}) * \sin(\text{pitch}) * \sin(\text{heading})) + (\sin(\text{roll}) * \cos(\text{heading}))) + Z(-(\cos(\text{roll}) * \sin(\text{pitch}) * \cos(\text{heading})) - (\sin(\text{roll}) * \sin(\text{heading}))) \quad \text{Eqn. (14)}$$

$$Y' = X(-(\sin(\text{roll}) * \cos(\text{pitch}))) + Y((\sin(\text{roll}) * \sin(\text{pitch}) * \sin(\text{heading})) + (\cos(\text{roll}) * \cos(\text{heading}))) + Z((\sin(\text{roll}) * \sin(\text{pitch}) * \cos(\text{heading})) - (\cos(\text{roll}) * \sin(\text{heading}))) \quad \text{Eqn. (15)}$$

$$Z' = X(\sin(\text{pitch})) + Y(\cos(\text{pitch}) * \sin(\text{heading})) + Z(\cos(\text{pitch}) * \cos(\text{heading})) \quad \text{Eqn. (16)}$$

The rotated vector (X', Y', Z') may then be translated into azimuth (A$_{neighbor}$) and elevation (E$_{neighbor}$) angles relative to the neighbor node's platform [act 1335] according to the following:

$$A = \text{atan } 2(Y'/Z') \quad \text{Eqn. (17)}$$

$$E = \text{atan } 2(X'/(\text{sqrt}(Z'*Z' + Y'*Y'))) \quad \text{Eqn. (18)}$$

The neighbor node's antenna mounting angles may then be subtracted from the azimuth (A$_{neighbor}$) and elevation (E$_{neighbor}$) angles [act 1340]. An antenna gain table 600 corresponding to the antenna type extracted from the received message may be indexed with the azimuth (A$_{neighbor}$) and elevation (E$_{neighbor}$) angles to retrieve a transmit antenna gain (XmitAntGain$_1$) [act 1405](FIG. 14). The antenna gain may then be retrieved from the antenna gain field 610 of the table entry 605 in which the angle relative to center 615 equals the azimuth (A$_{neighbor}$) and the elevation 625 equals the elevation (E$_{neighbor}$).

A three-dimensional vector (X, Y, Z) may be calculated that indicates the direction from the locate node to the remote neighboring node [act 1410] using the local node's position data (X$_{local}$, Y$_{local}$, Z$_{local}$) and the neighbor node's position data (X$_{neighbor}$, Y$_{neighbor}$, Z$_{neighbor}$). The three-dimensional vector may be calculated using the following:

$$X = X_{neighbor} - X_{local} \quad \text{Eqn. (19)}$$

$$Y = Y_{neighbor} - Y_{local} \quad \text{Eqn. (20)}$$

$$Z = Z_{neighbor} - Z_{local} \quad \text{Eqn. (21)}$$

where
X$_{local}$ is the local node's altitude,
Y$_{local}$ is the local node's easting,
Z$_{local}$ is the local node's northing,
X$_{neighbor}$ is the neighbor node's altitude,
Y$_{neighbor}$ is the neighbor node's easting, and
Z$_{neighbor}$ is the neighbor node's northing.

The calculated 3-D vector may then be rotated by the local node's current heading (psi), pitch (theta) and roll (phi) angles [act 1415], to produce a rotated vector (X', Y', Z'), according to the following relations:

$$X' = X(\cos(\text{roll}) * \cos(\text{pitch})) + Y(-(\cos(\text{roll}) * \sin(\text{pitch}) * \sin(\text{heading})) + (\sin(\text{roll}) * \cos(\text{heading}))) + Z(-(\cos(\text{roll}) * \sin(\text{pitch}) * \cos(\text{heading})) - (\sin(\text{roll}) * \sin(\text{heading}))) \quad \text{Eqn. (22)}$$

$$Y' = X(-(\sin(\text{roll}) * \cos(\text{pitch}))) + Y((\sin(\text{roll}) * \sin(\text{pitch}) * \sin(\text{heading})) + (\cos(\text{roll}) * \cos(\text{heading}))) + Z((\sin(\text{roll}) * \sin(\text{pitch}) * \cos(\text{heading})) - (\cos(\text{roll}) * \sin(\text{heading}))) \quad \text{Eqn. (23)}$$

$$Z' = X(\sin(\text{pitch})) + Y(\cos(\text{pitch}) * \sin(\text{heading})) + Z(\cos(\text{pitch}) * \cos(\text{heading})) \quad \text{Eqn. (24)}$$

The rotated vector (X', Y', Z') may then be translated into azimuth (A$_{local}$) and elevation (E$_{local}$) angles relative to the local node's platform [act 1420] according to the following:

$$A = \text{atan } 2(Y'/Z') \quad \text{Eqn. (25)}$$

$$E = \text{atan } 2(X'/(\text{sqrt}(Z'*Z' + Y'*Y'))) \quad \text{Eqn. (26)}$$

The local node's antenna mounting angles may then be subtracted from the azimuth (A$_{local}$) and elevation (E$_{local}$) angles [act 1425]. An antenna gain table 600 corresponding to the receive antenna type of the local node may be indexed with the azimuth (A$_{local}$) and elevation (E$_{local}$) to retrieve a receive antenna gain (RcvAntGain$_1$). The antenna gain may be retrieved from the antenna gain field 629 of the table entry 605 in which the angle relative to center 615 equals the azimuth (A$_{local}$) and the elevation 625 equals the elevation (E$_{local}$). A pathloss between the neighbor node and the current node may then be determined [act 1435] according to the following relation:

$$\text{Pathloss} = \text{XmitPower}_1 + \text{XmitAntGain}_1 + \text{RcvAntGain}_1 - \text{RcvPower}_1 \quad \text{Eqn. (21)}$$

The Pathloss value may represent a symmetric path loss between the local node and the neighboring node. A normalized transmit power (XmitPower$_{NORM}$) may then be determined according to the following relation:

$$\text{XmitPower}_{NORM} = \text{RcvPower}_2 + \text{PathLoss} \quad \text{Eqn. (22)}$$

where RcvPower$_2$ is set to a value above an assumed signal detection threshold of the neighboring node. The normalized transmit power XmitPower$_{NORM}$ assumes 0 dB antenna gains at transmission and reception. Normalizing the transmit power permits the combination of data on estimated pathloss from many different antenna types.

A minimum receive antenna gain (RcvAntGain$_2$), associated with the neighbor antenna may be assumed [act 1505]. This minimum receive antenna gain may represent some assumed minimum receive gain that the receiving antenna will have regardless of the orientation of the neighboring node. A transmit antenna gain (XmitAntGain$_2$) may be set equal to the previously determined receive antenna gain (RcvAntGain$_1$) [act 1510]. An actual transmit power (XmitPower$_{ACTUAL}$) for transmitting data to the neighbor node may be determined [act 1515] according to the following relation:

$$\text{XmitPower}_{ACTUAL} = \text{XmitPower}_{NORM} - (\text{XmitAntGain}_2 + \text{RcvAntGain}_2) \quad \text{Eqn. (23)}$$

The determined actual transmit power XmitPower$_{ACTUAL}$ along with the neighbor identifier may be stored in an entry of neighbor transmit power table 700 as XmitPower 715 and neighbor ID 710, respectively [act 1520]. For any subsequent transmission of packets to a neighboring node, table 700 may be consulted for an appropriate transmit power to be used for transmitting to the neighboring node. Transmission of packets to a neighboring node may use the exemplary antenna selection process of FIGS. 11-12 above. The exemplary antenna selection process of FIGS. 11-12 may be performed in parallel, or serially, with the three-dimensional transmit power determination process of FIGS. 13-15.

CONCLUSION

Systems and methods consistent with the present invention, therefore, provide mechanisms for employing one or more directional antennas at nodes in an ad-hoc, multi-hop wireless network. Consistent with the present invention, directional antennas, such as, for example, switched beam or steered beam types of directional antennas, may be used for transmitting and/or receiving packets. In conjunction with the one or more directional antennas, three-dimensional position determining techniques may, consistent with the present invention, be employed to determine locations of neighboring nodes in the network. The determined locations may be used as a basis for determining headings between a transmitting and receiving node that can, in conjunction with known antenna gain patterns associated with one or more directional antennas of the transmitting and receiving nodes, be used for selecting an appropriate transmit power that accounts for the orientation of the directional antennas of the transmitting and receiving nodes relative to one another.

The foregoing description of embodiments of the present invention provides illustration and description, but is not intended to be exhaustive or to limit the invention to the precise form disclosed. Modifications and variations are possible in light of the above teachings or may be acquired from practice of the invention. For example, instead of the antenna to platform azimuth/elevation table 400 of FIG. 4, an array of size 360×360 can be preloaded with the correct antenna number, and azimuth and elevation angles, rounded to the nearest integer, may be used to index the 360 (azimuth)×360 (elevation) array to immediately return the correct antenna. Additionally, the present invention may be used for transmitting a message that results from the network protocols to a neighboring node. In this case, table 500 of FIG. 5 could be used to determine the position and orientation of the neighboring node for selecting an appropriate transmit antenna and determining an appropriate transmit power. The principles of the present invention may further be employed when receiving a packet from a neighbor node that requires a quick, immediate response. For example, CTS may need to be sent back in response to an RTS or an ACK packet may need to be sent in response to an incoming data packet. For these cases, the incoming packet contains the most recent position and orientation data of the remote node and the data may be inserted into the neighbor position/orientation table 500 for transmitting a response packet.

Furthermore, the present invention could be used for receiving data as well as transmitting data. Any time data is expected to be transmitted from a remote node, the most recent three-dimensional position of that node could be used to point the receive antenna accurately. For example, if a RTS was received at the omni-directional antenna, but indicated that a data packet would soon be coming, the receiving node could then use the three-dimensional position from the RTS to accurately point the antenna for receiving the packet. Similarly, in a TDMA system, the transmission from any remote node in its designated slot may serve as a method for updating the location of that node to all of its neighbors such that receptions of data from that node in future time slots could be optimized.

While series of acts have been described in FIGS. 8-15, the order of the acts may vary in other implementations consistent with the present invention. Also, non-dependent acts may be performed in parallel. No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the following claims and their equivalents.

What is claimed is:

1. A method, comprising:
   receiving, by a first node in an ad-hoc wireless network, a first message from a second node in the ad-hoc wireless network, the message comprising three-dimensional position data associated with the second node;
   selecting, by the first node, an antenna, from a plurality of antennas that transmit from the first node through the ad-hoc wireless network, where selecting the antenna is based on the three-dimensional position data associated with the second node; and
   transmitting, on the ad-hoc wireless network, a second message from the first node to the second node via the selected antenna.

2. The method of claim 1, where the three-dimensional position data relates to a latitude, longitude and altitude of the second node.

3. The method of claim 1, where the plurality of antennas comprise a plurality of directional antennas and the selected antenna comprises a directional antenna of the plurality of directional antennas.

4. The method of claim 1, further comprising:
   determining heading, pitch and roll values associated with the first node, where selecting the antenna from the plurality of antennas is further based on the determined heading, pitch and roll values.

5. The method of claim 1, further comprising:
   determining three-dimensional position data associated with the first node, where selecting the antenna from the plurality of antennas is further based on the three-dimensional position data associated with the first node.

6. The method of claim 1, where the second message comprises a type of the selected antenna, a transmit power at which the second message is transmitted, three-dimensional position data associated with the first node, and heading, pitch and roll values associated with the first node.

7. A non-transient computer-readable medium containing instructions for controlling at least one processor in a device, the instructions comprising:
  one or more instruction for receiving data associated with a three-dimensional position of a node in an ad hoc wireless network, where the three-dimensional position relates to a latitude, longitude and altitude of the node;
  one or more instruction for selecting a directional antenna, from a plurality of directional antennas that transmit through the ad-hoc wireless network, where selecting the directional antenna is based on the three-dimensional position data; and
  one or more instruction for transmitting a message to the node via the selected directional antenna.

8. A first node in an ad-hoc wireless network, the first node comprising:
  a transceiver coupled to a plurality of antennas that transmit through the ad-hoc wireless network;
  a memory to store instructions; and
  a processor to execute the instructions in the memory to:
    receive, at the transceiver, data associated with a three-dimensional position of a second node in the ad-hoc wireless network,
    select an antenna, from the plurality of antennas, based on the received data associated with the three-dimensional position of the second node, and
    transmit, from the transceiver, additional data to the second node via the selected antenna.

9. A system comprising:
  means for receiving a message from a first node of a plurality of nodes in a wireless network, the message comprising a three-dimensional position and orientation associated with the first node, the orientation comprising heading, pitch and roll values associated with the first node;
  means for determining, based on the three-dimensional position and the orientation associated with the first node, a vector from a second node of the plurality of nodes to the first node; and
  means for selecting an antenna, from a plurality of antennas for transmitting data that transmit through the wireless network, based on the determined vector.

10. The non-transient computer-readable medium of claim 7, where the data relates to a latitude, longitude and altitude of the node.

11. The non-transient computer-readable medium of claim 7, further comprising:
  one or more instructions for determining heading, pitch and roll values associated with the node, where selecting the directional antenna from the plurality of directional antennas is further based on the determined heading, pitch and roll values.

12. The non-transient computer-readable medium of claim 7, further comprising:
  one or more instructions for determining three-dimensional position data associated with the device, where selecting the antenna from the plurality of antennas is further based on the three-dimensional position data associated with the device.

13. The non-transient computer-readable medium of claim 12, where the three-dimensional position data associated with the device further includes at least one of heading, pitch and roll values associated with the device.

14. The non-transient computer-readable medium of claim 7, where the message comprises a type of the selected directional antenna, a transmit power at which the message is transmitted, three-dimensional position data associated with the device, and heading, pitch and roll values associated with the device.

15. The first node of claim 8, where the data, associated with the three-dimensional position of the second node, relates to a latitude, longitude and altitude of the second node.

16. The first node of claim 8, where the plurality of antennas comprise a plurality of directional antennas.

17. The first node of claim 8, where the processor is further to:
  determine heading, pitch and roll values associated with the first node, and
  select the antenna, from the plurality of antennas, further based on the determined heading, pitch and roll values associated with the first node.

18. The first node of claim 8, where the processor is further to:
  determine three-dimensional position data associated with the first node, and
  select the antenna, from the plurality of antennas, further based on the determined three-dimensional position data associated with the first node.

19. The first node of claim 8, where the additional data comprises at least one of a type of the selected antenna, a transmit power at which the additional data is transmitted, three-dimensional position data associated with the first node, or heading, pitch and roll values associated with the first node.

* * * * *